(12) United States Patent
Panwar et al.

(10) Patent No.: US 9,942,514 B1
(45) Date of Patent: Apr. 10, 2018

(54) VIDEO CALL POWER OPTIMIZATION

(71) Applicant: QUALCOMM Incorporated, San Diego, CA (US)

(72) Inventors: Neeraj Panwar, Hyderabad (IN); Ishdeep Singh Juneja, Hyderabad (IN); Ashish Bhardwaj, Hyderabad (IN); Jagdeep Singh, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/582,622

(22) Filed: Apr. 29, 2017

(51) Int. Cl.
*H04N 7/14* (2006.01)
*H04W 52/02* (2009.01)
*G06K 9/00* (2006.01)

(52) U.S. Cl.
CPC ......... *H04N 7/147* (2013.01); *G06K 9/00255* (2013.01); *H04N 7/148* (2013.01); *H04W 52/0251* (2013.01)

(58) Field of Classification Search
CPC .... H04N 7/147; H04N 7/148; G06K 9/00255; H04W 52/0251
See application file for complete search history.

(56) References Cited

U.S. PATENT DOCUMENTS

| | | | |
|---|---|---|---|
| 9,219,880 B2 | 12/2015 | Cox et al. | |
| 9,426,187 B2 * | 8/2016 | Hirata | ............... H04N 7/142 |
| 9,467,653 B2 | 10/2016 | Bentley et al. | |
| 2005/0099492 A1 * | 5/2005 | Orr | ............... H04L 12/1827 348/14.08 |
| 2007/0211141 A1 * | 9/2007 | Christiansen | ..... H04L 29/06027 348/14.08 |
| 2011/0211114 A1 | 9/2011 | Cooper | |
| 2012/0081392 A1 * | 4/2012 | Arthur | ............... H04N 5/23222 345/633 |
| 2014/0003450 A1 * | 1/2014 | Bentley | ............... H04N 7/15 370/468 |
| 2014/0099004 A1 * | 4/2014 | DiBona | ............... H04N 7/15 382/118 |
| 2014/0192134 A1 * | 7/2014 | Jung | ............... G06K 9/00255 348/14.02 |
| 2015/0296178 A1 * | 10/2015 | Aarrestad | ............... H04N 7/15 348/14.16 |
| 2015/0358577 A1 * | 12/2015 | Zhou | ............... H04L 51/10 348/14.01 |

FOREIGN PATENT DOCUMENTS

| | | |
|---|---|---|
| EP | 2053850 A1 | 4/2009 |
| WO | 9403014 A1 | 2/1994 |

* cited by examiner

*Primary Examiner* — Stella Woo
(74) *Attorney, Agent, or Firm* — Muncy, Geissler, Olds & Lowe, P.C.

(57) ABSTRACT

The disclosure generally relates to optimizing power consumption while one or more users are inactive during a video call. More particularly, according to various aspects, a current camera view may be captured at a first user equipment (UE) during a video call with at least a second UE. In response to the first UE determining that a user associated with the first UE is inactive on a camera at the first UE (e.g., when no faces are visible in the current camera view), the first UE may reduce uplink transmissions that are allocated to video content corresponding to the current camera view while the user associated with the first UE is inactive on the camera.

30 Claims, 9 Drawing Sheets

VIDEO CALL POWER OPTIMIZATION

TECHNICAL FIELD

The various aspects and embodiments described herein generally relate to wireless communications, and more particularly, to optimizing power consumption on a user equipment (UE) while one or more users are inactive during a video call.

BACKGROUND

Wireless communication systems have developed through various generations, including a first-generation analog wireless phone service (1G), a second-generation (2G) digital wireless phone service (including interim 2.5G and 2.75G networks) and third-generation (3G) and fourth-generation (4G) high-speed data and Internet-capable wireless services. There are many wireless communication systems in use, including Cellular and Personal Communications Service (PCS) systems. Exemplary cellular systems include the cellular Analog Advanced Mobile Phone System (AMPS), digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies. More recently, Long Term Evolution (LTE) has been developed as a wireless communications protocol for mobile phones and other terminals to communicate data at high speeds. LTE is based on GSM, and includes contributions from various GSM-related protocols such as Enhanced Data rates for GSM Evolution (EDGE) and Universal Mobile Telecommunications System (UMTS) protocols such as High-Speed Packet Access (HSPA).

One service that has experienced significant increases in popularity in recent years is video calling due to the ever-increasing ability to transfer substantial data over a network at high speeds. In general, video calling is a feature whereby video and audio content are received via a downlink and sent via an uplink for the purpose of face-to-face communication. Video calls can be made over an LTE network via an IP Multimedia Subsystem (IMS) video call (e.g., using the Video-over-LTE or ViLTE service) and other available application (e.g., FaceTime, Skype, Messenger, etc.). However, when one or more users are not active on the camera during a video call, the uplink data has no significance for the end-to-end video call because the user who is inactive on the camera has no visual appearance for the user at the other end of the video call. As such, when a user is outside the area visible to the camera, transmitting the video content may waste resources at both the transmitting and receiving ends in addition to introducing unnecessary network congestion. These issues may have a wider impact in conference calls or other group calling scenarios because every available user participating in the group call has to receive and decode the inactive user video content.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

According to various aspects, a method for optimizing power consumption during a video call as described herein may comprise capturing, at a first user equipment (UE), a current camera view during a video call with at least a second UE, determining, at the first UE, that a user associated with the first UE is inactive on a camera at the first UE based at least in part on a determination that no faces are visible in the current camera view, and reducing, at the first UE, uplink transmissions that are allocated to video content corresponding to the current camera view while the user associated with the first UE is inactive on the camera at the first UE.

According to various aspects, an apparatus as described herein may comprise at least a camera and one or more processors coupled to the camera and configured to capture a current view of the camera during a video call, determine that a user associated with the apparatus is inactive on the camera based at least in part on a determination that no faces are visible in the current view of the camera, and reduce uplink transmissions allocated to video content corresponding to the current view of the camera while the user associated with the apparatus is inactive on the camera.

According to various aspects, an apparatus as described herein may comprise means for capturing a current camera view during a video call, means for determining that a user associated with the apparatus is inactive on a camera based at least in part on a determination that no faces are visible in the current camera view, and means for reducing uplink transmissions allocated to video content corresponding to the current camera view while the user associated with the apparatus is inactive on the camera.

According to various aspects, a computer-readable storage medium as described herein may have computer-executable instructions recorded thereon, wherein the computer-executable instructions may be configured to cause a user equipment (UE) to capture a current camera view at the UE view during a video call, determine that a user associated with the UE is inactive on a camera based at least in part on a determination that no faces are visible in the current camera view, and reduce uplink transmissions allocated to video content corresponding to the current camera view while the user associated with the UE is inactive on the camera.

Other objects and advantages associated with the aspects and embodiments disclosed herein will be apparent to those skilled in the art based on the accompanying drawings and detailed description.

BRIEF DESCRIPTION OF THE DRAWINGS

A more complete appreciation of the various aspects and embodiments described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Various aspects and embodiments are disclosed in the following description and related drawings to show specific examples relating to exemplary aspects and embodiments. Alternate aspects and embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage, or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects and/or embodiments may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

The techniques described herein may be used in connection with various wireless communication systems such as CDMA, TDMA, FDMA, OFDMA, and SC-1-DMA systems. The terms "system" and "network" are often used interchangeably. A CDMA system may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95, and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink UTRA, E-UTRA, UMTS, LTE, and GSM are described in documents from the "3rd Generation Partnership Project" (3GPP). CDMA2000 and UMB are described in documents from an organization named "3rd Generation Partnership Project 2" (3GPP2). For clarity, certain aspects are described below for LTE, and LTE terminology may be used in much of the description below.

As used herein, the terms "user device," "user equipment" (or "UE"), "user terminal," "client device," "communication device," "wireless device," "wireless communications device," "handheld device," "mobile device," "mobile terminal," "mobile station," "handset," "access terminal," "subscriber device," "subscriber terminal," "subscriber station," "terminal," and variants thereof may interchangeably refer to any suitable mobile or stationary device. Accordingly, the above-mentioned terms may suitably refer to any one or all of cellular telephones, smart phones, personal or mobile multimedia players, personal data assistants, laptop computers, personal computers, tablet computers, smart books, palm-top computers, wireless electronic mail receivers, multimedia Internet-enabled cellular telephones, wireless gaming controllers, and similar devices with a programmable processor, memory, and circuitry to connect to and communicate over a radio access network (RAN) that implements a particular radio access technology (RAT), over a wired network, over a wireless local area network (WLAN) (e.g., based on IEEE 802.11, etc.), and/or with other devices via a direct device-to-device (D2D) or peer-to-peer (P2P) connection.

According to various aspects, a communication link through which one or more UEs can send signals to the RAN, the wired network, the WLAN, etc. is called an uplink or reverse link channel (e.g., a reverse traffic channel, a reverse control channel, an access channel, etc.), while a communication link through which the RAN, the wired network, the WLAN, etc. can send signals to UEs is called a downlink or forward link channel (e.g., a paging channel, a control channel, a broadcast channel, a forward traffic channel, etc.). As used herein the term traffic channel (TCH) can refer to either an uplink/reverse link channel or a downlink/forward link channel.

Figure 1:
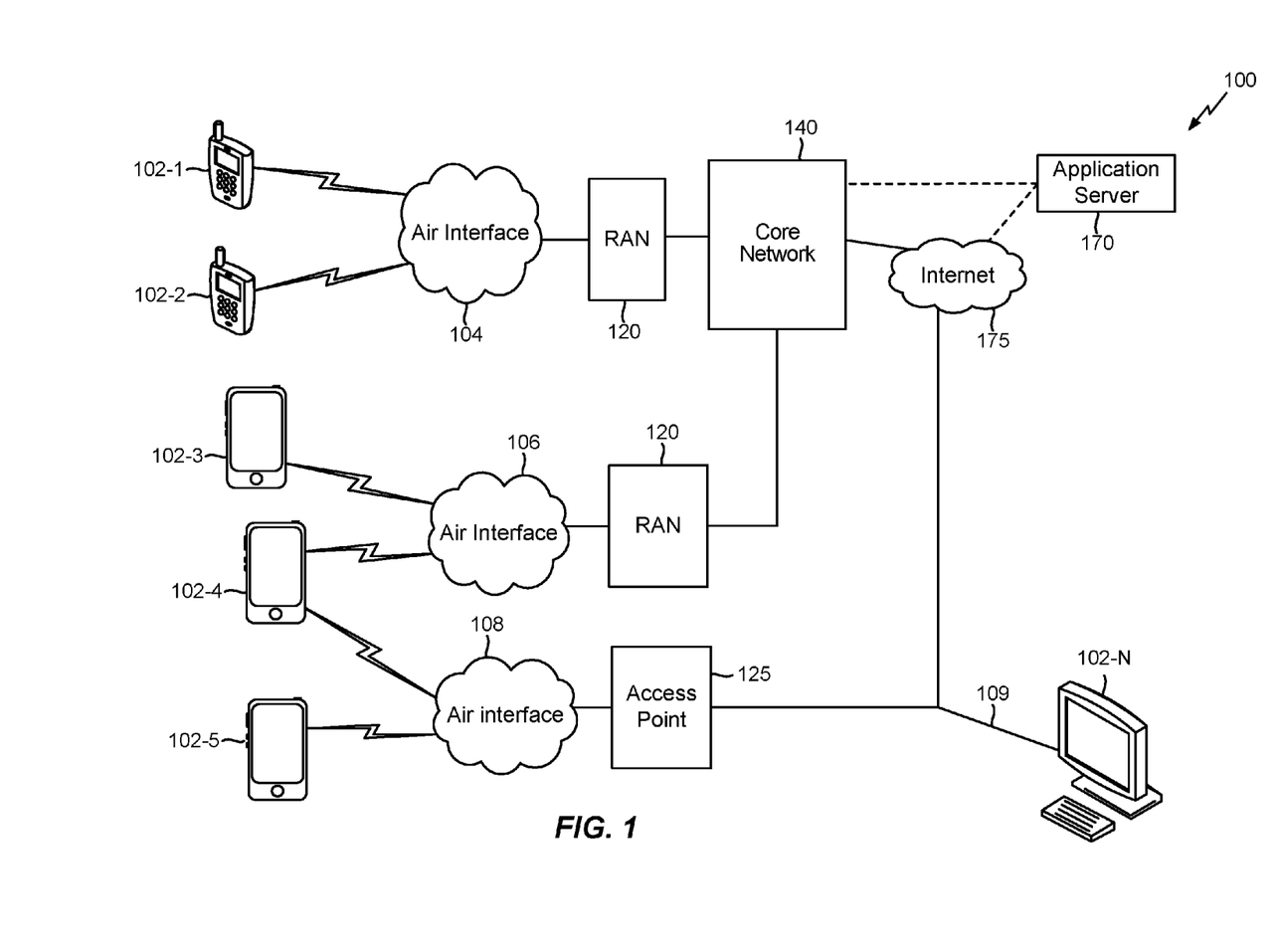
FIG. 1 illustrates a high-level system architecture of a wireless communications system that may support video calling services, according to various aspects.

According to various aspects, FIG. 1 illustrates a high-level system architecture of a wireless communications system 100 that may support video calling services. In various embodiments, the wireless communications system 100 may contain various UEs, including UE 102-1, UE 102-2, UE 102-3, UE 102-4, UE 102-5, UE 102-N, collectively referred to herein as UEs 102-1 . . . N. The UEs 102-1 . . . N can include cellular telephones, smart phones, personal or mobile multimedia players, personal data assistants, laptop computers, personal computers, tablet computers, and so on. For example, in FIG. 1, UE 102-1 and 102-2 are illustrated as cellular calling phones, UE 102-3, UE 102-4, and UE 102-5 are illustrated as cellular touchscreen phones or smart phones, and UE 102-N is illustrated as a desktop computer.

Referring to FIG. 1, the UEs 102-1 . . . N may communicate with an access network (e.g., the RAN 120, an access point 125, etc.) over a physical communications interface or layer, shown in FIG. 1 as air interfaces 104, 106, 108 and/or a direct or indirect wired connection 109. The air interfaces 104 and 106 can comply with a given cellular communications protocol (e.g., CDMA, EV-DO, eHRPD, GSM, EDGE, W-CDMA, LTE, etc.), while the air interface 108 can comply with a wireless local area network (WLAN) protocol (e.g., IEEE 802.11). Although not explicitly shown in FIG. 1, the RAN 120 may include various access points that can serve UEs over air interfaces, such as the air interfaces 104 and 106. Each access point in the RAN 120 can be referred to as an access node or AN, an access point or AP, a base station or BS, a Node B, an evolved Node B, an eNodeB or eNB, and so on. These access points can be terrestrial access points (or ground stations) or satellite access points. The RAN 120 may be configured to connect to a core network 140 that can perform various functions, including bridging calls (e.g., video calls) between UEs serviced via the RAN 120 and other UEs serviced via on the RAN 120 or an altogether different RAN.

In various embodiments, the RAN 120 may be configured to bridge circuit-switched (CS) calls between UEs serviced via the RAN 120 and other UEs serviced via on the RAN 120 or an altogether different RAN. In various embodiments, the RAN 120 may also be configured to mediate an exchange of packet-switched (PS) data with external networks such as Internet 175. The Internet 175 may generally include various routing agents and processing agents (not explicitly shown in FIG. 1 for sake of convenience). In FIG. 1, UE 102-1 is shown as connecting to the Internet 175 via the wired connection 109 (i.e., separate from the core network 140, such as over an Ethernet connection to an 802.11-based wireless local area network). The Internet 175 can thereby bridge packet-switched data communications (including data associated with video calls) between UE 102-N and UEs 102-1 to 102-5 via the core network 140. Also shown in FIG. 1 is the access point 125 separate from the RAN 120. The access point 125 may connect to the Internet 175 independent from the core network 140 (e.g., via an optical communication system, a cable modem, etc.). The air interface 108 may serve UE 102-4 or UE 102-5 over a local wireless connection, such as IEEE 802.11 in an example. UE 102-N is shown as a desktop computer with the wired connection 109 to the Internet 175, such as a direct connection to a modem or router, which can correspond to the access point 125 itself in one example (e.g., a WLAN router with wired and/or wireless connectivity may correspond to the access point 125).

Referring to FIG. 1, an application server 170 is shown as connected to the Internet 175, the core network 140, or both. The application server 170 can be implemented as multiple structurally separate servers, or alternately may correspond to a single server. The application server 170 may be configured to support one or more communication services for UEs that can connect to the application server 170 via the core network 140 and/or the Internet 175 (e.g., Video-over-LTE (ViLTE) or other suitable video call services in addition to other possible services such as Voice-over-Internet Protocol (VoIP) sessions, Voice-over-LTE (VoLTE) sessions, Push-to-Talk (PTT) sessions, group communication sessions, sessions that involve Rich Communication Services (RCS) sessions, social networking services, etc.).

According to various aspects, one examples protocol-specific implementation for the RAN 120 and the core network 140 is provided below with respect to FIG. 2 to help explain the wireless communications system 100 in more detail. Furthermore, in the following description, the components of the RAN 120 and the core network 140 may be described with reference to functions that relate to supporting packet-switched (PS) communications that can be used in a video call. However, those skilled in the art will appreciate that legacy circuit-switched (CS) components may be present though not explicitly shown in FIG. 2 or otherwise described at length herein.

Figure 2:
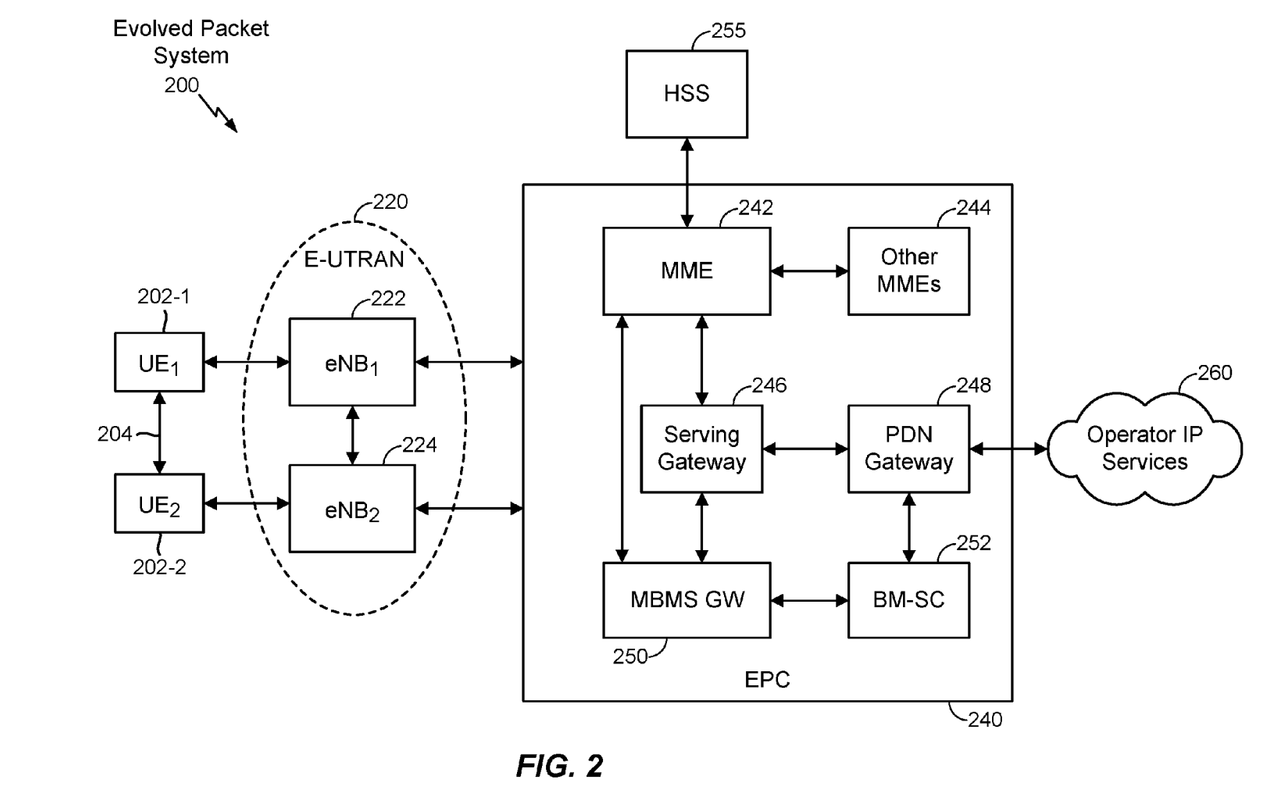
FIG. 2 illustrates an exemplary wireless network architecture that may support video calling services, according to various aspects.

According to various aspects, FIG. 2 illustrates an exemplary wireless network architecture 200 that may support video calling services between a first UE 202-1 and a second UE 202-2. In various embodiments, the wireless network architecture 200 may comprise a Long Term Evolution (LTE) (or Evolved Packet System (EPS)) network architecture 200. In various embodiments, the network architecture 200 may include an Evolved UMTS Terrestrial Radio Access Network (E-UTRAN) 220, an Evolved Packet Core (EPC) 240, a Home Subscriber Server (HSS) 255, and Internet Protocol (IP) Services 260 associated with an operator (e.g., a mobile network operator (MNO)). The EPS network architecture 200 can interconnect with other access networks and core networks (not shown), such as a UMTS access network or an IP core network. As shown, the EPS network architecture 200 provides packet-switched services; however, those skilled in the art will readily appreciate that the various concepts disclosed herein may be extended to networks that provide circuit-switched services.

In various embodiments, implementation, the E-UTRAN 220 may include a first eNode B (eNB) 212 in communication with UE 202-1 and a second eNB (eNB) 224 in communication with UE 202-2. The eNBs 222, 224 may provide user and control plane protocol terminations toward the UEs 202-1, 202-2 and may be connected to each other via a backhaul (e.g., an X2 interface). The eNBs 222, 224 may also be referred to as base stations, Node Bs, access points, base transceiver stations, radio base stations, radio transceivers, transceiver functions, a basic service set (BSS), an extended service set (ESS), or some other suitable terminology. The eNBs 222, 224 each provide an access point to the EPC 240 for the respective UEs 202-1, 202-2.

The eNBs 222, 224 may each connect to the EPC 240 via an Si interface, wherein the EPC 240 may include a Mobility Management Entity (MME) 242, other MMEs 244, a Serving Gateway 246, a Multimedia Broadcast Multicast Service (MBMS) Gateway 250, a Broadcast Multicast Service Center (BM-SC) 252, and a Packet Data Network (PDN) Gateway 248. The MME 242 is the control node that processes the signaling between the UEs 202-1, 202-2 and the EPC 240. Generally, the MME 242 provides bearer and connection management. All user IP packets are transferred through the Serving Gateway 246, which may be connected to the PDN Gateway 248. The PDN Gateway 248 provides UE IP address allocation as well as other functions. The PDN Gateway 248 is connected to the Operator IP Services 260, which may include the Internet, an intranet, an IP Multimedia Subsystem (IMS), and a PS Streaming Service (PSS). The BM-SC 252 may provide functions for MBMS user service provisioning and delivery. The BM-SC 252 may serve as an entry point for content provider MBMS transmission, may be used to authorize and initiate MBMS Bearer Services within a PLMN, and may be used to schedule and deliver MBMS transmissions. The MBMS Gateway 250 may be used to distribute MBMS traffic to the eNBs (e.g., 222, 224) belonging to a Multicast Broadcast Single Frequency Network (MBSFN) area broadcasting a particular service, and may be responsible for session management (start/stop) and for collecting eMBMS related charging information.

In various embodiments, a UE pair (e.g., UE 202-1 and UE 202-2) may establish a device-to-device (D2D) connection 204 to communicate directly without utilizing the respective eNBs 222, 224. The UE pair 202-1, 202-2 may then transfer data traffic over the D2D connection 204. In general, one or more entities in the network infrastructure (e.g., eNBs 222, 224, entities in the EPC 240, etc.) may coordinate the D2D communication between the UEs 202-1, 202-2, in that the network entities may assist in establishing the D2D connection 204, control use in a D2D mode versus a legacy mode, provide security support, etc. In various embodiments, the UE pair 202-1, 202-2 may be configured establish the D2D connection 204 autonomously, wherein initial discovery and establishing the D2D connection 204 may be based on an ability to communicate signals directly therebetween.

According to various aspects, at least the wireless communications system 100 and the wireless network architecture 200 described above may support video calls among two or more UEs. For example, in various embodiments, a video call may be a one-to-one video call between a first UE and a second UE. However, the various aspects and embodiments described herein further contemplate group video calls among three or more UEs. In any case, during the video call, each UE may generally receive downlink video content and downlink audio content from the other participant(s) and transmit uplink video content and uplink audio content to the other participant(s). In many cases, the video call may be made with the intention to engage in face-to-face communication.

Figure 3:
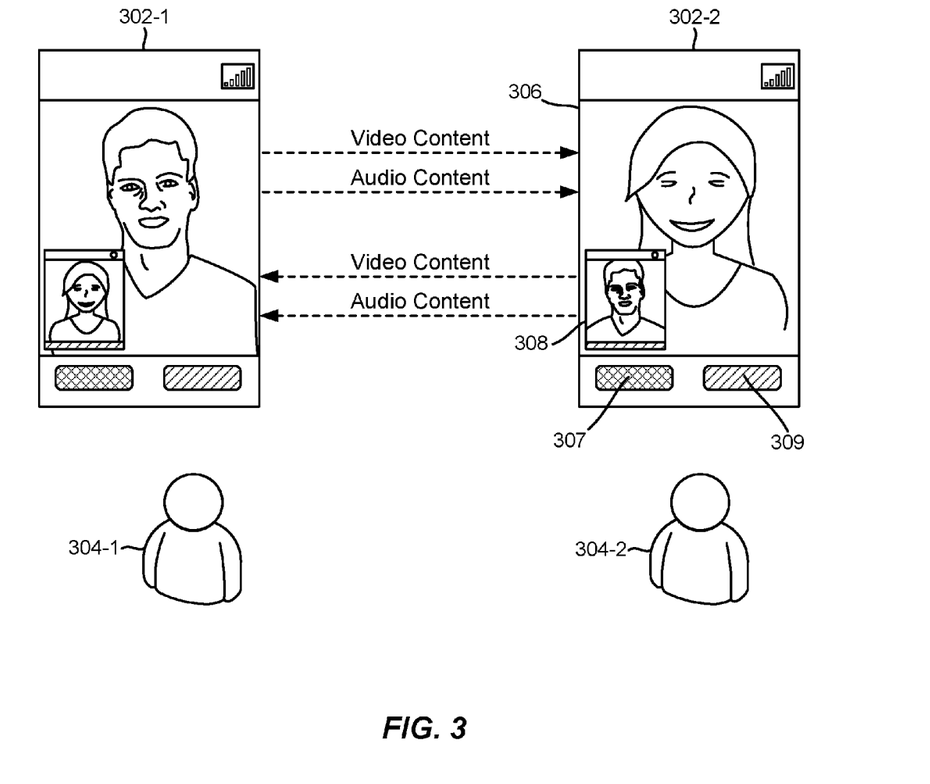
FIG. 3 illustrates an exemplary video call scenario in which each user participating in the video call is present or is otherwise active in a camera view, according to various aspects.

For example, according to various aspects, FIG. 3 illustrates a typical scenario in which a first user 304-1 at a first UE 302-1 is engaged in a video call involving face-to-face communication with a second user 304-2 at a second UE 302-2. Although the particular scenario shown in FIG. 3 appears to be a one-to-one video call, those skilled in the art will appreciate that the principles described herein may equally apply to a group video call among three or more UEs, including one or more that are not explicitly shown in FIG. 3. According to various embodiments, during the video call, a user interface shown on a display at each respective UE 302-1, 302-2, etc. may include a main display area 306 where downlink video content from remote users is shown. For example, in FIG. 3, the main display area 306 on UE 302-1 shows downlink video content received/transmitted from UE 302-2, while the main display area 306 on UE 302-2 similarly shows downlink video content received/transmitted from UE 302-1. Furthermore, as will be generally understood to those skilled in the art, the user interface shown on the display at each respective UE 302-1, 302-2, etc. may further include a preview area 308 where local image/video content is shown (i.e., the video content captured using the local camera, which corresponds to the uplink video content to be transmitted to the other UE(s) participating in the video call). In addition, the user interface shown on the display at each respective UE 302-1, 302-2, etc. may one or more buttons 307, 309 (e.g., to end the video call, enter a mute mode to suspend uplink audio transmissions, to switch between front-facing and rear-facing camera views, etc.).

According to various aspects, FIG. 3 generally illustrates an ideal video call scenario in which each user participating in the video call is present or is otherwise active in a camera view. For example, as shown in FIG. 3, the first user 304-1 is visible in the camera view at the first UE 302-1, whereby the first UE 302-1 may transmit uplink video content corresponding to the current camera view, which may also be shown at the first UE 302-1 within the preview area 308. In addition, the first UE 302-1 may transmit uplink audio content corresponding to sound(s) captured via a local microphone at the first UE 302-1. The uplink video content transmitted from the first UE 302-1 may be received at the second UE 302-2 as downlink video content and rendered within the main display area 306 at the second UE 302-2. In a similar respect, the uplink audio content transmitted from the first UE 302-1 may be received at the second UE 302-2 as downlink audio content and rendered or otherwise output via an appropriate output device (e.g., local speakers, a headphone connector, etc.). In addition, substantially the same functions may occur in the other direction, whereby video content and audio content transmitted from the second UE 302-2 may be received and rendered at the first UE 302-1 such that the first user 304-1 and the second user 304-2 can engage in a face-to-face communication.

According to various aspects, while FIG. 3 illustrates the ideal video call scenario in which each user participating in the video call is present or otherwise active in the camera view, there may be many circumstances in which the first user 304-1 and/or the second user 304-2 may become inactive in the camera view. For example, in various embodiments, one user may move outside the camera view (e.g., to use the restroom or another suitable reason). However, the various aspects and embodiments described herein contemplate scenarios in which one or more users may move outside the camera view while still being considered "active" in the camera view despite not being visible or otherwise present in the camera view. For example, a user intend to show a presentation, a surrounding environment, etc. such that the video content should continue to be transmitted/received despite the user not being present in the camera view. However, in other cases where the video content does not have any significance for the end-to-end video call (e.g., the bathroom scenario) described above, certain power and performance optimizations may be achievable.

Figure 4:
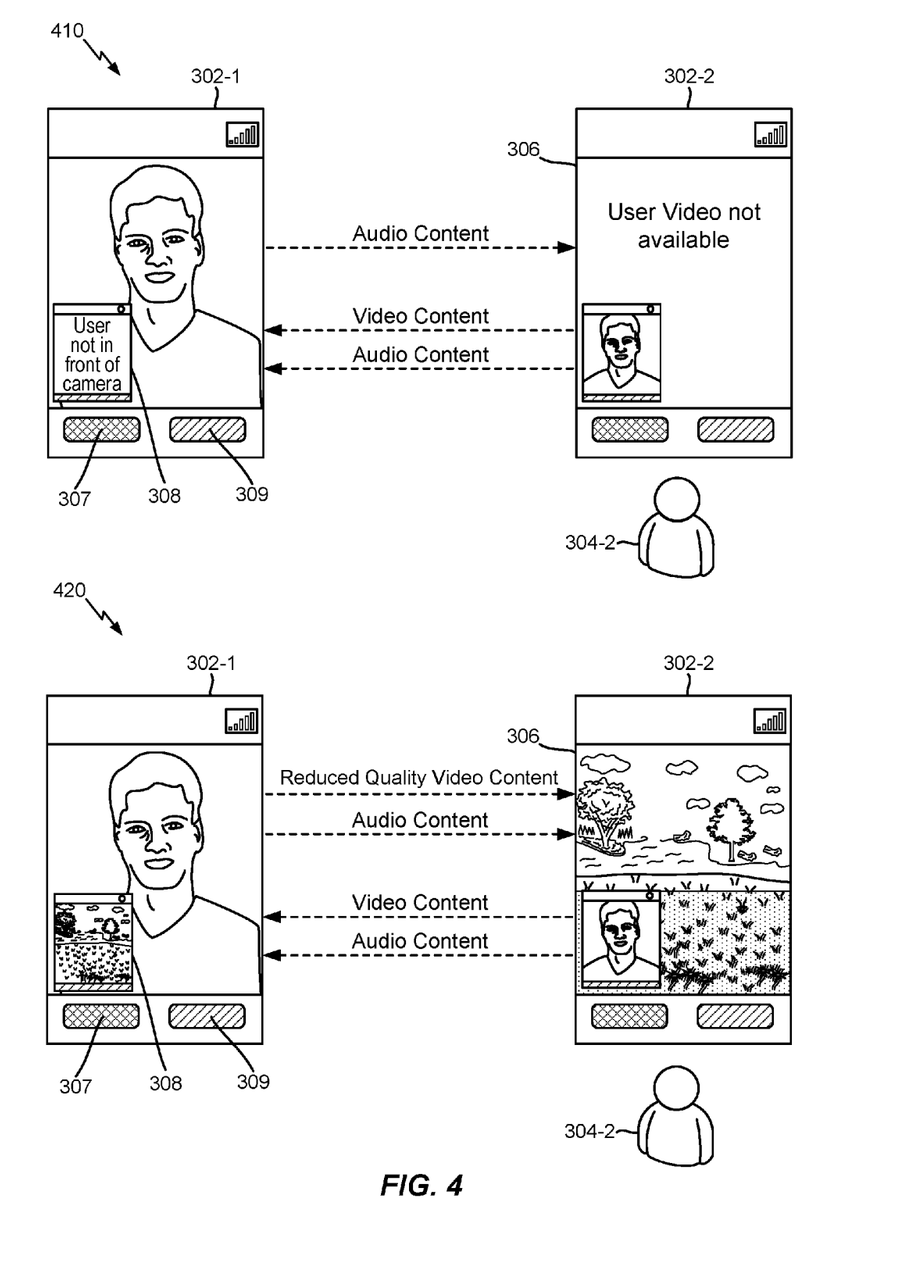
FIG. 4 illustrates exemplary video call scenarios in which one or more users participating in the video call are not present or are otherwise inactive in a camera view, according to various aspects.

For example, referring to FIG. 4, two example scenarios 410, 420 are illustrated therein where user 304-1 is no longer present within the camera view at the first UE 302-1. In this case, assuming that the intention of the first user 304-1 is not to show a presentation, a surrounding environment, etc. to the second user 304-2, uplink transmissions that are allocated to video content captured at the first UE 302-1 may be reduced because the first user 304-1 does not appear in the main display area 306 at the second UE 302-2 (or the preview area 308 at the first UE 302-1). Otherwise, power may be unnecessarily consumed at both the first UE 302-1 and the second UE 302-2 without there being any significance to the video content. In particular, sending the uplink data corresponding to the video content captured at the first UE 302-1 may unnecessarily consume power at the first UE 302-1, while receiving and decoding the video data at the second UE 302-2 may likewise cause unnecessary power consumption at the second UE 302-2. Furthermore, rendering the video content at the second UE 302-2 may cause further power consumption, as the display on a battery-powered device typically consumes significant power. Further still, routing the video content from the first UE 302-1 to the second UE 302-2 may cause unnecessary network congestion. The above-mentioned issues may be exacerbated in a group video call involving three or more users, as each available endpoint involved in the video call would need to receive, decode, and display the video content corresponding to the inactive user(s).

According to various aspects, as mentioned above, FIG. 4 generally illustrate two respective scenarios 410, 420 to reduce power consumption during a video call while one or more users participating in the video call are not present or are otherwise inactive in a camera view. More particularly, in the example scenario 410, uplink transmissions that are allocated to video content captured at the first UE 302-1 may be reduced in the sense that uplink video content transmissions may be suspended during a period when the first user 304-1 is inactive in the camera view. For example, in various embodiments, the first UE 302-1 may employ a facial recognition algorithm based on the image(s) captured in the current camera view and determine that no faces are present in the current camera view. In various embodiments, the facial recognition algorithm may be configured to consider limited features at a relatively coarse level to evaluate whether one or more faces are present in the camera view. Of course, in other embodiments, the facial recognition algorithm may have the ability to identify a specific person's face. In any case, the first UE 302-1 may determine that the first user 304-1 is not active in the camera view based at least in part on the user's face not being present in the camera view. In various embodiments, the first user 304-1 may nonetheless be considered "active" in the camera view if the first user 304-1 indicates that background video content such as a presentation or the surrounding environment is to be displayed.

As such, when the first user 304-1 is not present within the current camera view and the first user 304-1 has not otherwise indicated that background video content is to be displayed, uplink video content transmissions from the first UE 302-1 to the second UE 302-2 may be suspended as shown in scenario 410. In various embodiments, the uplink video content transmissions may be suspended after the first user 304-1 has been inactive in the camera view for longer than a predetermined duration (e.g., a threshold number of seconds). In other embodiments, the first user 304-1 may provide a manual indication that the first user 304-1 will be entering an inactive mode (e.g., via selecting an applicable button 307, 309, etc.). In various embodiments, as shown in scenario 410, uplink audio content transmissions may suitably continue while the uplink video content transmissions are suspended. In this manner, suspending the uplink video content transmissions while the first user 304-1 is inactive may reduce the uplink data to be transmitted from the first UE 302-1 and the downlink data to be received, decoded, and rendered at the second UE 302-2. Consequently, power consumption may be reduced at both ends, network bandwidth may be made available, and performance may be improved (e.g., because the second user 304-2 may learn that the first user 304-1 has become inactive based on the user interface indication). Furthermore, the various aspects and embodiments described herein contemplate that video content transmitted from the second UE 302-2 and received at the first UE 302-1 may suitably continue or that such video content transmissions may be suspended or reduced while the first user 304-1 is inactive in the camera view (e.g., because the first user 304-1 is not present, the first user 304-1 could be outside viewing range to see the video content from the second user 304-2, rendering the downlink video content meaningless). For example, assuming a one-to-one video call, the first UE 302-1 may send an indication to the second UE 302-2 in response to detecting that the first user 304-1 is inactive, whereby the first UE 302-1 may reduce uplink video content transmissions based on the detection that the first user 304-1 is inactive while the second UE 302-2 may likewise reduce uplink video content transmissions based on the indication received from the first UE 302-1.

According to various aspects, the example scenario 420 further illustrated in FIG. 4 may generally involve many aspects that are substantially the same as described above with respect to scenario 410. However, in scenario 420, uplink transmissions that are allocated to video content captured at the first UE 302-1 may be reduced in the sense that uplink video content transmissions may be transmitted at a reduced quality. For example, as described in further detail below, the first UE 302-1 may employ one or more of various suitable techniques to reduce a data rate at which the uplink video content is transmitted, which may translate to a reduction in the video quality. Accordingly, while the first user 304-1 is inactive in the camera view (possibly subject to a time-based threshold), the first UE 302-1 may reduce the quality at which uplink video content is transmitted to effectuate a reduction in the uplink video content transmissions, which may also reduce the downlink resources used at the second UE 302-2 to receive and decode the video content transmitted from the first UE 302-1. Consequently, power consumption may be reduced at both ends, network bandwidth may be made available, and performance may be improved (e.g., because the second user 304-2 may learn that the first user 304-1 has become inactive based on the user interface indication). Furthermore, the various aspects and embodiments described herein contemplate that the first UE 302-1 may continue to transmit uplink audio content to the second UE 302-2 in the normal manner without any reduction in quality while the first user 304-1 is inactive in the camera view. In a similar respect, video content transmissions from the second UE 302-2 to the first UE 302-1 may suitably continue or be suspended or be reduced while the first user 304-1 is inactive in the camera view, while audio content transmissions from the second UE 302-2 to the first UE 302-1 continue in the normal manner without any reduction in quality.

According to various aspects, as mentioned above one or more of various suitable techniques may be employed to reduce the data rate (and thus the quality) associated with the uplink video content to be transmitted while the first user 304-1 and/or the second user 304-2 are inactive on the camera. For example, in various embodiments, the uplink pixel quality may be adaptively reduced to effectuate a reduction in the uplink video quality (e.g., assuming that 1080p is the normal pixel quality used to transmit the uplink video content, the uplink pixel quality may be reduced to 720p, 480p, 360p, etc.). In another example, an uplink video frame rate may be adaptively reduced (e.g., from 30 frames-per-second to 25 frames-per-second). In still another example, an uplink video encoding technique may be changed (e.g., from a .mp4 encoding format to a 0.3gp encoding format or another suitable format associated with relatively lower data rates). In embodiments that change the uplink video encoding technique, the change may first be negotiated among the first UE 302-1 and the second UE 302-2 (and/or any other UEs involved in the video call). In yet another example, the uplink video content may be transmitted in black-and-white rather than color, as one (1) bit in a black-and-white video may typically translate to twelve (12) bits for a color copy of the same video. In yet another example, a screen size used to display the video content may be resized to a smaller window at both the originating and terminating UEs 302-1, 302-2, etc. Of course, as mentioned above, those skilled in the art will appreciate that the above-mentioned techniques to reduce the video quality are not intended to be exhaustive or limiting, as any suitable combination of the above-mentioned techniques may be used to reduce the video quality and other suitable techniques may also be used.

Figure 5:
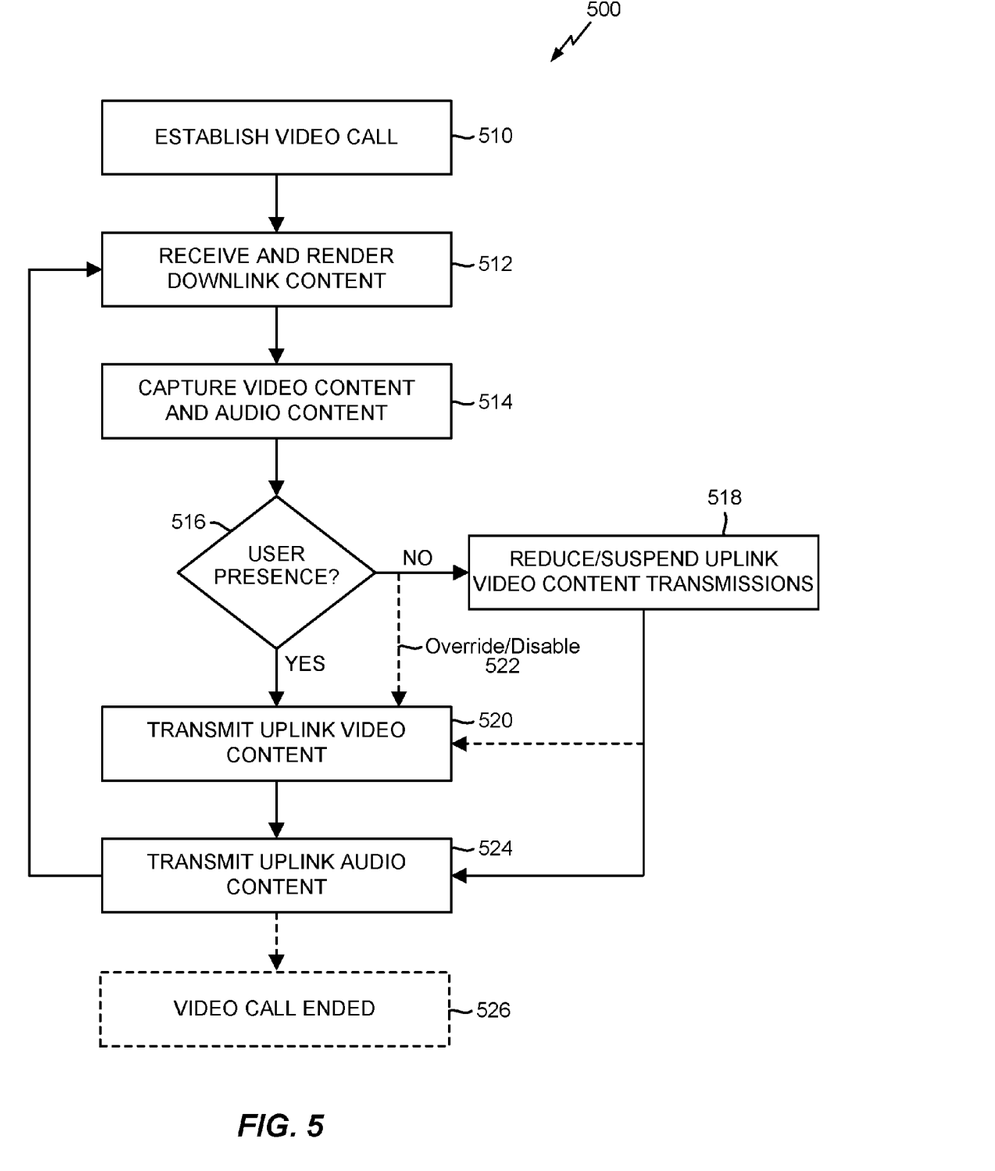
FIG. 5 illustrates an exemplary method to optimize power consumption during a video call while one or more users participating in the video call are not present or are otherwise inactive in a camera view, according to various aspects.
Figure 6:
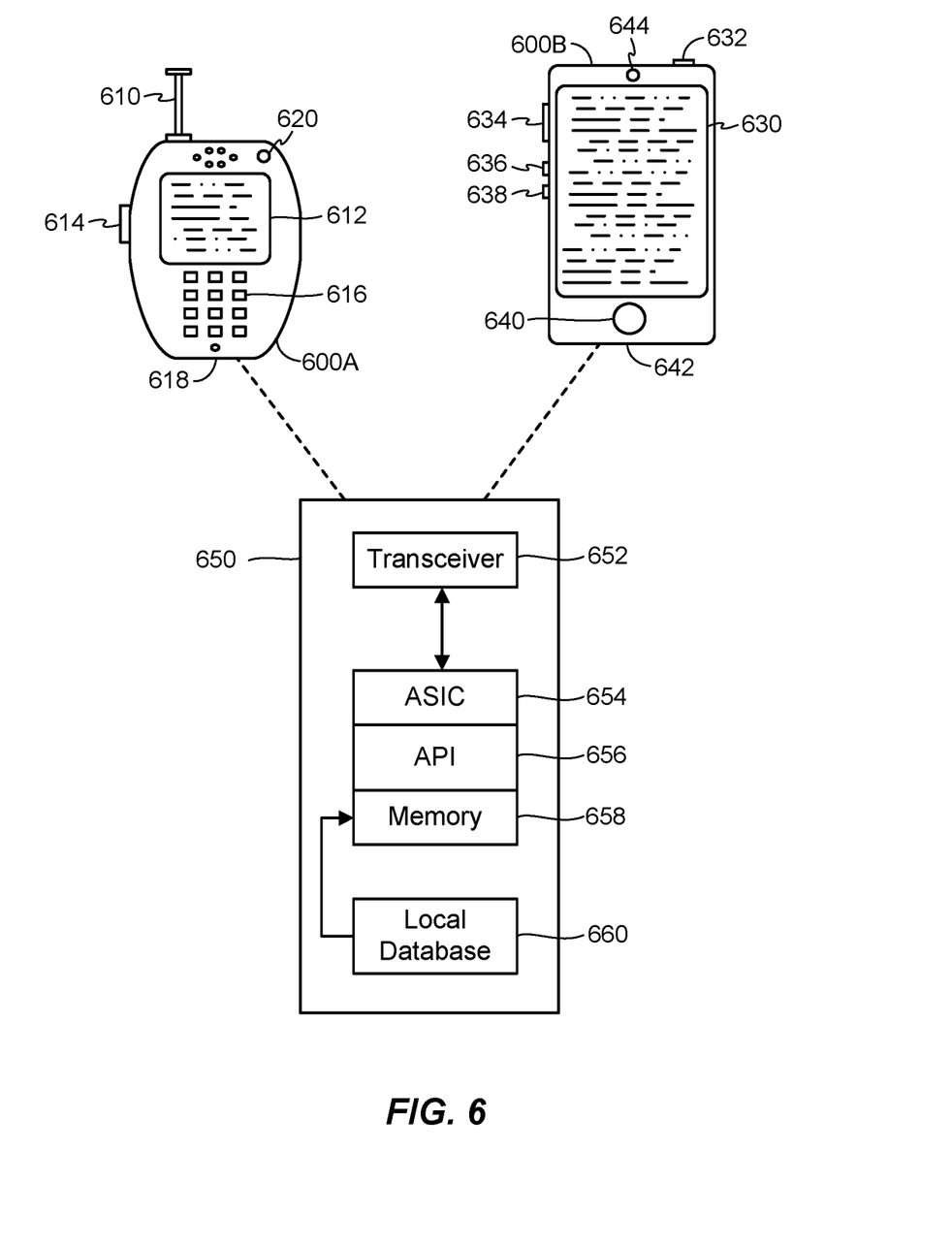
FIG. 6 illustrates exemplary UEs that may optimize power consumption during a video call in accordance with the various aspects and embodiments described herein.
Figure 7:
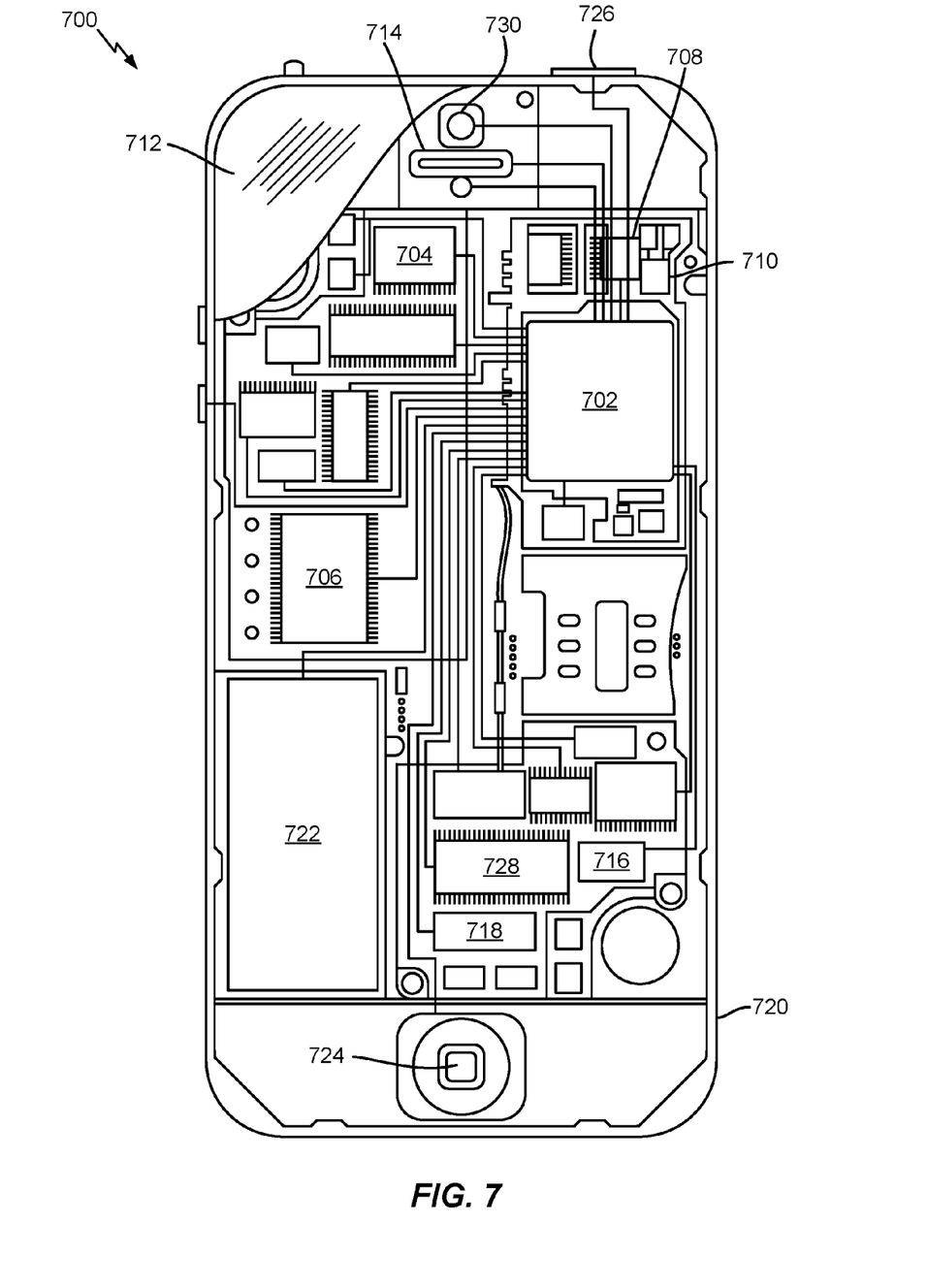
FIG. 7 illustrates an exemplary mobile device that may be configured to optimize power consumption during a video call in accordance with the various aspects and embodiments described herein.
Figure 8:
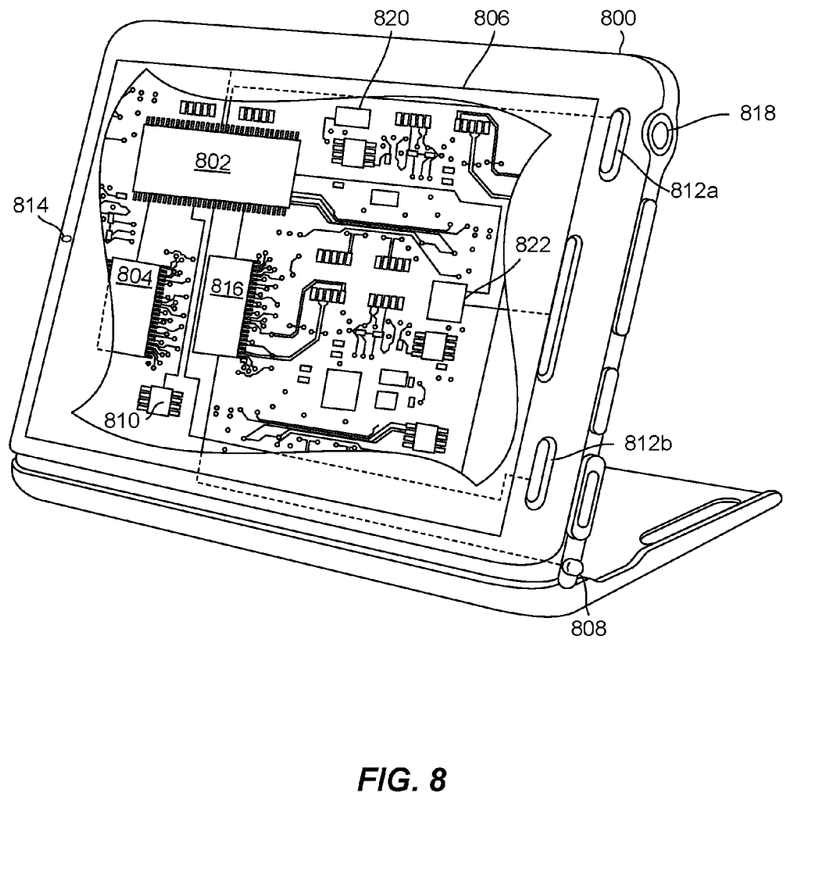
FIG. 8 illustrates an exemplary wireless device that may be configured to optimize power consumption during a video call in accordance with the various aspects and embodiments described herein.

According to various aspects, FIG. 5 illustrates an example method 500 that can be implemented to optimize power consumption during a video call while one or more users participating in the video call are inactive in a camera view. In general, the method 500 shown in FIG. 5 may be implemented on any suitable user equipment (UE) having capabilities to participate in a video call. For example, in various embodiments, the method 500 illustrated in FIG. 5 may be implemented on a UE that has a hardware configuration as shown in FIG. 6, FIG. 7, FIG. 8, and/or FIG. 9. However, those skilled in the art will appreciate that the hardware configurations shown in FIG. 6 to FIG. 9 are exemplary only, as the method 500 may be implemented on UEs having other suitable hardware configurations that provide capabilities to participate in a video call.

In particular, at block 510, a video call may be established among two or more UEs according to any suitable existing or future-developed video calling service, protocol, application, etc. In general, from the perspective of a particular UE, the video call may involve receiving downlink video content that was transmitted from the other UE(s) participating in the video call as well as audio content that was transmitted from the other UE(s). Accordingly, the downlink content may be suitably received and rendered at block 512. Furthermore, the video call may involve transmitting uplink video content that corresponds to a current camera view and uplink audio content that corresponds to sound captured via a local microphone or other audio input device (e.g., a wireless headset). Accordingly, in various embodiments, the video content corresponding to the current camera view and the audio content corresponding to the local sound input may be captured at block 514.

In various embodiments, a determination may be made at block 516 as to whether the user is "active" on the camera. For example, in various embodiments, the user may be considered active on the camera when one or more faces are recognized within the image(s) corresponding to the current camera view. In various embodiments, the one or more faces may be recognized based on limited features such that the recognition is that one or more faces exist in the image(s) rather than the particular user(s) that are associated with the recognized face(s). In such a case, the UE may transmit the uplink video content at block 520 and transmit the uplink audio content at block 524 in the normal manner. The method 500 may then return to block 512 to continue to process the downlink/uplink video and audio data.

In various embodiments, returning to decisional block 516, in some instances there may be a determination that no faces exist within the image(s) corresponding to the current camera view. In such cases (possibly subject to a time-based threshold), the method 500 may branch to block 518, where at least uplink video content transmissions may be reduced. In particular, reducing the uplink video content transmissions may generally comprise reducing the data rate and/or quality at which the uplink video content is transmitted. For example, as mentioned above, reducing the data rate and/or quality at which the uplink video content is transmitted may comprise adaptively reducing an uplink pixel quality at which the uplink video content is transmitted, adaptively reducing an uplink video frame rate at which the uplink video content is transmitted, changing an uplink video encoding technique (dependent or otherwise based on a negotiation with the other UE(s) involved in the video call), transmitting the uplink video content in black-and-white rather than color, reducing a window size associated with the uplink video content, and/or any suitable combination(s) thereof. The uplink video content corresponding to the current camera view may therefore be transmitted at the reduced quality level at block 520 while uplink audio content is transmitted at block 524 in the normal manner without any reduction in quality.

In various embodiments, reducing the uplink video content transmissions may comprise suspending uplink video content transmissions until the user again becomes active on the camera. In such cases, block 520 to transmit the uplink video content may be skipped while uplink audio content is transmitted at block 524 in the normal manner. In various embodiments, the user may also be given the option to override or disable the above-described power optimizations. For example, as depicted at 522, the user may override or disable the above-described power optimizations when the user intends to show a presentation, show a surrounding environment, or otherwise wishes to continue sending video content regardless of whether the user is not present or otherwise visible in the camera view. In various embodiments, the method 500 may continue to loop through blocks 512-524 until the video call has ended, as depicted at block 526.

According to various aspects, FIG. 6 illustrates exemplary wireless devices 600A, 600B that may optimize power consumption during a video call in accordance with the various embodiments as described herein. In the example embodiments shown in FIG. 6, the wireless device 600A is illustrated as a telephone and the wireless device 600B is illustrated as a touchscreen device (e.g., a smart phone, a tablet computer, etc.). As shown in FIG. 6, an external casing of the wireless device 600A may be configured with an antenna 610, a display 612, at least one button 614 (e.g., a power button, a volume control button, etc.), a keypad 616, a microphone 618, and a screen-facing camera 620. Furthermore, as shown in FIG. 6, the wireless device 600B may include an external casing configured with a touchscreen display 630, peripheral buttons 632, 634, 636, and 638 (e.g., a power control button, a volume or vibrate control button, an airplane mode toggle button, etc.), at least one front-panel button 640 (e.g., a Home button, etc.), a microphone 642, and a screen-facing camera 644. In various embodiments, the button 614 and/or other peripheral buttons 632, 634, 636 and 638 may be used to open direct communication to a target device. However, those skilled in the art will appreciate that other devices and methods can be alternately used to engage in communication, such as a "soft key" on touch screen display 630, other methods as known in the art. Furthermore, those skilled in the art will appreciate that the wireless device 600A may include various other components that may not be separately illustrated in FIG. 6 or described herein (e.g., a rear-facing camera, speakers, etc.).

In various embodiments, while not shown explicitly in FIG. 6, the wireless device 600B can include one or more external antennas and/or one or more integrated antennas that are built into the external casing of the wireless device 600B, including but not limited to wireless local area network (WLAN) antennas, cellular antennas, satellite position system (SPS) antennas (e.g., global positioning system (GPS) antennas), and so on, and the wireless device 600A may likewise include one or more external and/or integrated antennas in addition to the antenna 610. In any case, the one or more external and/or integrated antennas (including at least the antenna 610) can be used to open a direct communication channel with the wireless devices 600A and/or 600B and thereby provide a direct communication interface to the wireless devices 600A and/or 600B, wherein the direct communication interface may typically comprise hardware known to those skilled in the art. Furthermore, in various embodiments, the direct communication interface can integrate with standard communication interfaces associated with the wireless devices 600A and/or 600B that are ordinarily used to carry video, audio, and other data to and from the wireless devices 600A and/or 600B.

Furthermore, although internal components of the wireless device 600A and the wireless device 600B can be embodied with different hardware configurations, FIG. 6 shows one exemplary platform 650 that may provide a basic high-level configuration for internal hardware components associated with the wireless devices 600A and/or 600B. In particular, the platform 650 can generally receive and execute software applications, data, and/or commands transmitted from a cellular network that may ultimately come from a core network, the Internet, and/or other remote servers and networks (e.g., an application server, web URLs, etc.). The platform 650 can also independently execute locally stored applications without cellular network interaction. The platform 650 can include a transceiver 652 coupled to an application specific integrated circuit (ASIC) 654, or other processor, microprocessor, logic circuit, or other data processing device. The ASIC 654 or other processor executes an application programming interface (API) 656 layer that interfaces with any application environment resident in a memory 658, which can include the operating system loaded on the ASIC 654 and/or any other resident programs in the memory 658 (e.g., the "binary runtime environment for wireless" (BREW) wireless device software platform developed by QUALCOMM®). The memory 658 can be comprised of read-only memory (ROM) or random-access memory (RAM), electrically erasable programmable ROM (EEPROM), flash cards, or any memory common to computer platforms. The platform 650 also can include a local database 660 that can store applications not actively used in memory 658, as well as other data. The local database 660 is typically a flash memory cell, but can be any secondary storage device as known in the art, such as magnetic media, EEPROM, optical media, tape, soft or hard disk, or the like.

According to various aspects, the functionality described herein to optimize power consumption during a video call while one or more users are inactive can be implemented on the wireless devices 600A, 600B shown in FIG. 6 and/or other suitable devices with similar external and/or internal components. For example, as will be apparent to those skilled in the art, the various functional features described herein can be embodied in discrete elements, software modules executed on a processor, and/or any combination of software and hardware to achieve the functionality described herein. For example, the ASIC 654, the memory 658, the API 656, and the local database 660 may all be used cooperatively to load, store and execute any software used to implement the video call power optimization(s) as described herein and perform the various associated functions described herein, whereby the logic to perform such functions may be distributed over various elements. Alternatively, the functionality could be incorporated into one discrete component. Furthermore, certain wireless devices that may be used in the various embodiments disclosed herein may not include certain components and/or functionalities associated with the wireless devices 600A and 600B shown in FIG. 6. Therefore, those skilled in the art will appreciate that the features associated with the wireless devices 600A and 600B shown in FIG. 6 are merely illustrative and the disclosure is not limited to the illustrated features or arrangements.

According to various aspects, wireless communication the wireless devices 600A, 600B can be based on different technologies, including, without limitation, CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the wireless devices 600A and/or 600B from and using various networks and network configurations. Accordingly, the illustrations provided herein are not intended to limit the aspects of the disclosure and are merely to aid in the description of various aspects disclosed herein.

According to various aspects, FIG. 7 illustrates an exemplary mobile device 700 that can be configured to optimize power consumption during a video call while one or more users are inactive in accordance with the various aspects and embodiments described herein. In various embodiments, the mobile device 700 may include a processor 702 coupled to a touchscreen controller 704 and an internal memory 706. The processor 702 may be one or more multi-core integrated circuits designated for general or specific processing tasks. The internal memory 706 may be volatile or non-volatile memory, and may also be secure and/or encrypted memory, or unsecure and/or unencrypted memory, or any combination thereof. The touchscreen controller 704 and the processor 702 may also be coupled to a touchscreen panel 712, such as a resistive-sensing touchscreen, capacitive-sensing touchscreen, infrared sensing touchscreen, etc. Additionally, a display of the mobile device need not have touchscreen capabilities.

The mobile device 700 may have one or more cellular network transceivers 708 coupled to the processor 702 and to one or more antennae 710 and configured to send and receive cellular communications over one or more wireless networks. The one or more transceivers 708 and antennae 710 may be used with the above-mentioned circuitry to implement the various aspects and embodiment described herein (e.g., to transmit uplink video and/or audio content and to receive downlink video and/or audio content during a video call). In various embodiments, the mobile device 700 may also include one or more subscriber identity module (SIM) cards 716, which may be coupled to the transceiver(s) 708 and/or the processor 702. The mobile device 700 may include a cellular network wireless modem chip 728 (e.g., a baseband processor), which may enable communication via a cellular network and be coupled to the processor 702.

In various embodiments, the mobile device 700 may include a peripheral device connection interface 718 coupled to the processor 702. The peripheral device connection interface 718 may be singularly configured to accept one type of connection, or multiply configured to accept various types of physical and communication connections, common or proprietary, such as USB, FireWire, Thunderbolt, or PCIe. The peripheral device connection interface 718 may also be coupled to a similarly configured peripheral device connection port (not explicitly shown in FIG. 7).

In various embodiments, the mobile device 700 may also include one or more speakers 714 to provide audio outputs and a screen-facing camera 730 to capture image and/or video inputs. The mobile device 700 may also include a housing 720, which may be constructed of a plastic, metal, or a combination of materials, to contain all or one or more of the components discussed herein. The mobile device 700 may include a power source 722 coupled to the processor 702, such as a disposable or rechargeable battery. The rechargeable battery 722 may also be coupled to the peripheral device connection port to receive a charging current from a source external to the mobile device 700. The mobile device 700 may also include a physical button 724 configured to receive user inputs and a power button 726 configured to turn the mobile device 700 on and off.

According to various aspects, FIG. 8 illustrates another exemplary wireless device 800 that may that may be configured to optimize power consumption during a video call while one or more users are inactive as described herein. Although the wireless device 800 is shown in FIG. 8 as having a tablet configuration, those skilled in the art will appreciate that the wireless device 800 may take other suitable forms (e.g., a smartphone). As shown in FIG. 8, the wireless device 800 may include a processor 802 coupled to internal memories 804 and 816, which may be volatile or non-volatile memories, and may also be secure and/or encrypted memories, unsecure and/or unencrypted memories, and/or any suitable combination thereof. In various embodiments, the processor 802 may also be coupled to a display 806, such as a resistive-sensing touch screen display, a capacitive-sensing infrared sensing touch screen display, or the like. However, those skilled in the art will appreciate that the display 806 need not have touch screen capabilities. Additionally, the wireless device 800 may have one or more antenna 808 that can be used to send and receive electromagnetic radiation that may be connected to a wireless data link and/or a cellular telephone transceiver 816 coupled to the processor 802. The wireless device 800 may also include physical buttons 812*a* and 812*b* configured to receive user inputs and a power button 818 configured to turn the wireless device 800 on and off. The wireless device 800 may also include, among other components, a microphone, a screen-facing camera 814, a battery 820 coupled to the processor 802, and a position sensor 822 (e.g., a GPS receiver) coupled to the processor 802.

Figure 9:
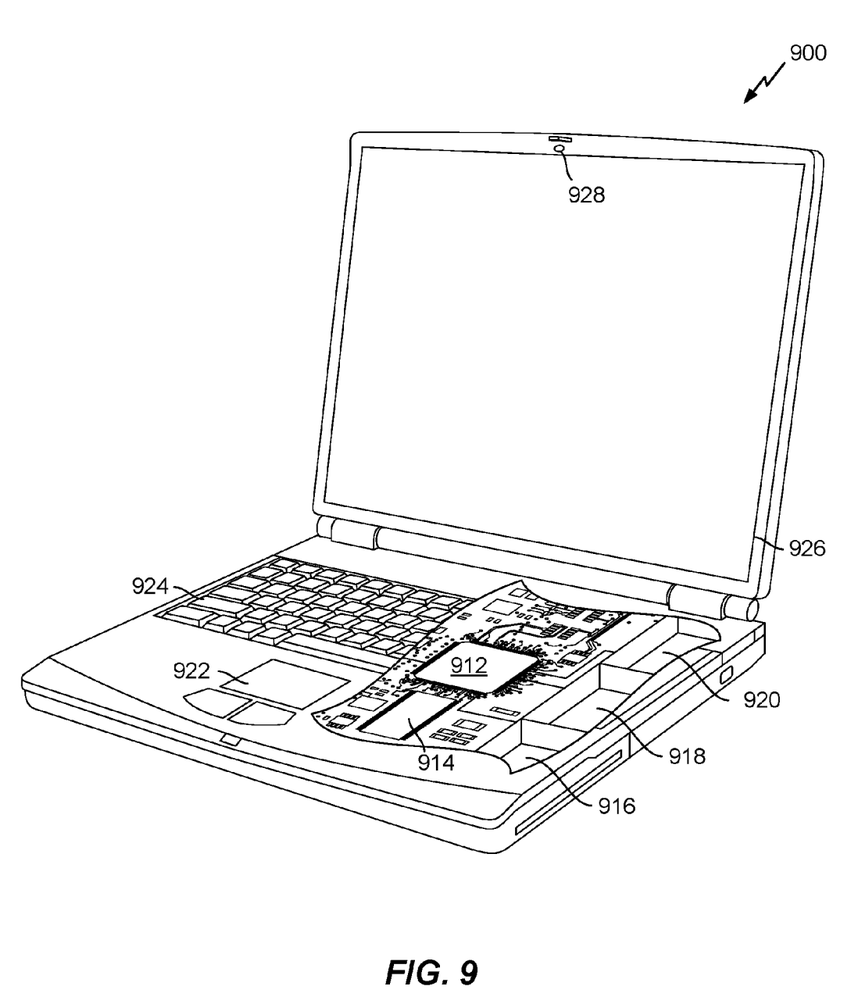
FIG. 9 illustrates an exemplary computing device that may be configured to optimize power consumption during a video call in accordance with the various aspects and embodiments described herein.

According to various aspects, FIG. 9 illustrates another exemplary computing device 900 that may that may be configured to optimize power consumption during a video call while one or more users are inactive as described herein. Although the personal computing device 900 is shown in FIG. 9 as a laptop computer, those skilled in the art will appreciate that the personal computing device 900 may take other suitable forms (e.g., a desktop computer). According to various embodiments, the personal computing device 900 shown in FIG. 9 may comprise a touchpad 922 having a surface that may serve as a pointing device, which may therefore receive drag, scroll, and flick gestures similar to those implemented on mobile computing devices typically equipped with a touch screen display as described above. The personal computing device 900 may further include a processor 912 coupled to a volatile memory 914 and a large capacity nonvolatile memory, such as a disk drive 916 of Flash memory. The personal computing device 900 may also include a floppy disc drive 918 and a compact disc (CD) drive 920 coupled to the processor 912. The personal computing device 900 may also include various connector ports coupled to the processor 912 to establish data connections or receive external memory devices, such as USB connector sockets, FireWire® connector sockets, and/or any other suitable network connection circuits that can couple the processor 912 to a network. In a notebook configuration, the personal computing device 900 may have a housing that includes the touchpad 922, a keyboard 924, a display 926, and a screen-facing camera 928 coupled to the processor 912. Furthermore, although not separately illustrated in FIG. 9, the personal computing device 900 may also include a microphone, a battery, and a position sensor (e.g., a GPS receiver) coupled to the processor 912. Additionally, the personal computing device 900 may have one or more antenna that can be used to send and receive electromagnetic radiation that may be connected to a wireless data link and/or a cellular telephone transceiver coupled to the processor 912. Other configurations of the personal computing device 900 may include a computer mouse or trackball coupled to the processor 912 (e.g., via a USB input) as are well known, which may also be used in conjunction with the various aspects and embodiments described herein.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects and embodiments described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences, and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in an IoT device. In the alternative, the processor and the non-transitory computer-readable medium may be discrete components in a user terminal.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes CD, laser disc, optical disc, DVD, floppy disk, and Blu-ray discs, which usually reproduce data magnetically and/or optically with lasers. Combinations of the above should also be included within the scope of computer-readable media.

While the foregoing disclosure shows illustrative aspects and embodiments, those skilled in the art will appreciate that various changes and modifications could be made herein without departing from the scope of the disclosure as defined by the appended claims. Furthermore, in accordance with the various illustrative aspects and embodiments described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method for optimizing power consumption during a video call, comprising:
   capturing, at a first user equipment (UE), a current camera view during a video call with at least a second UE;
   determining, at the first UE, that a user associated with the first UE is inactive on a camera at the first UE based at least in part on a determination that no faces are visible in the current camera view and that the user has not indicated an intention to use the current camera view to show background video content visible in an environment surrounding the first UE; and
   reducing, at the first UE, uplink transmissions that are allocated to video content corresponding to the current camera view in response to determining that the user is inactive on the camera, wherein the uplink transmissions allocated to the video content are reduced until one or more faces are visible in the current camera view.

2. The method recited in claim 1, wherein reducing the uplink transmissions that are allocated to the video content comprises reducing a data rate at which the video content corresponding to the current camera view is transmitted until the one or more faces are visible in the current camera view.

3. The method recited in claim 2, wherein reducing the data rate at which the video content is transmitted comprises reducing an uplink pixel quality at which the video content corresponding to the current camera view is transmitted.

4. The method recited in claim 2, wherein reducing the data rate at which the video content is transmitted comprises reducing an uplink video frame rate at which the video content corresponding to the current camera view is transmitted.

5. The method recited in claim 2, wherein reducing the data rate at which the video content is transmitted comprises changing an uplink encoding format in which the video content corresponding to the current camera view is transmitted.

6. The method recited in claim 2, wherein reducing the data rate at which the video content is transmitted comprises transmitting the video content corresponding to the current camera view in black-and-white.

7. The method recited in claim 2, wherein reducing the data rate at which the video content is transmitted comprises reducing a window size used to display the video content corresponding to the current camera view.

8. The method recited in claim 1, wherein reducing the uplink transmissions that are allocated to the video content comprises suspending the uplink transmissions that are allocated to the video content corresponding to the current camera view until the one or more faces are visible in the current camera view.

9. The method recited in claim 1, further comprising determining that no faces are visible in the current camera view based on a facial recognition algorithm.

10. The method recited in claim 1, further comprising resuming normal uplink video content transmissions in response to determining that one or more faces are visible in the current camera view such that the user is active on the camera at the first UE.

11. The method recited in claim 1, further comprising resuming normal uplink video content transmissions in response to the user indicating the intention to use the current camera view to show the background video content visible in the environment surrounding the first UE.

12. The method recited in claim 1, further comprising continuing normal uplink transmissions that are allocated to audio content captured via a local microphone while the user associated with the first UE is inactive on the camera at the first UE.

13. The method recited in claim 1, wherein the uplink transmissions allocated to the video content are reduced after the user associated with the first UE has been inactive on the camera for a duration that exceeds a predefined threshold.

14. The method recited in claim 1, further comprising transmitting, to the second UE, an indication that the user associated with the first UE is inactive on the camera at the first UE based on the video call being a one-to-one video call such that video content received on a downlink from the second UE is reduced while the user associated with the first UE is inactive on the camera at the first UE.

15. An apparatus, comprising:
a camera; and
one or more processors coupled to the camera and configured to capture a current view of the camera during a video call, determine that a user associated with the apparatus is inactive on the camera based at least in part on a determination that no faces are visible in the current view of the camera and that the user has not indicated an intention to use the current camera view to show background video content visible in a surrounding environment, and reduce uplink transmissions allocated to video content corresponding to the current view of the camera until one or more faces are visible in the current camera view based on the determination that the user is inactive on the camera.

16. The apparatus recited in claim 15, wherein the one or more processors are further configured to reduce a data rate at which the video content corresponding to the current view of the camera is transmitted until the one or more faces are visible in the current camera view.

17. The apparatus recited in claim 16, wherein the one or more processors are further configured to reduce an uplink pixel quality at which the video content corresponding to the current view of the camera is transmitted.

18. The apparatus recited in claim 16, wherein the one or more processors are further configured to reduce an uplink video frame rate at which the video content corresponding to the current view of the camera is transmitted.

19. The apparatus recited in claim 16, wherein the one or more processors are further configured to change an uplink encoding format in which the video content corresponding to the current view of the camera is transmitted.

20. The apparatus recited in claim 16, wherein the one or more processors are further configured to transmit the video content corresponding to the current view of the camera in black-and-white to reduce the data rate at which the video content is transmitted.

21. The apparatus recited in claim 16, wherein the one or more processors are further configured to reduce a window size used to display the video content corresponding to the current view of the camera to reduce the data rate at which the video content is transmitted.

22. The apparatus recited in claim 15, wherein the one or more processors are further configured to suspend the uplink transmissions allocated to the video content corresponding to the current view of the camera until the one or more faces are visible in the current camera view.

23. The apparatus recited in claim 15, wherein the one or more processors are further configured to determine that no faces are visible in the current view of the camera based on a facial recognition algorithm.

24. The apparatus recited in claim 15, wherein the one or more processors are further configured to resume normal uplink video content transmissions based on a determination that one or more faces are visible in the current view of the camera.

25. The apparatus recited in claim 15, wherein the one or more processors are further configured to resume normal uplink video content transmissions in response to the user indicating the intention to use the current camera view to show the background video content visible in the surrounding environment.

26. The apparatus recited in claim 15, further comprising:
a local microphone, wherein the one or more processors are further configured to continue normal uplink transmissions allocated to audio content captured via the local microphone while the user is inactive on the camera.

27. The apparatus recited in claim 15, wherein the uplink transmissions allocated to the video content are reduced after the user has been inactive on the camera for a duration that exceeds a predefined threshold.

28. The apparatus recited in claim 15, further comprising a transmitter configured to transmit an indication that the user is inactive on the camera to another call participant based on the video call being a one-to-one video call such that video content received on a downlink from the other call participant is reduced while the user is inactive on the camera.

29. An apparatus, comprising:
means for capturing a current camera view at the apparatus during a video call;
means for determining that a user associated with the apparatus is inactive on a camera based at least in part on a determination that no faces are visible in the current camera view and that the user has not indicated an intention to use the current camera view to show background video content visible in a surrounding environment; and
means for reducing uplink transmissions allocated to video content corresponding to the current camera view until one or more faces are visible in the current camera view in response to determining that the user is inactive on the camera.

30. A non-transitory computer-readable storage medium having computer-executable instructions recorded thereon, the computer-executable instructions configured to cause a user equipment (UE) to:
capture a current camera view at the UE during a video call;
determine that a user associated with the UE is inactive on a camera based at least in part on a determination that no faces are visible in the current camera view and that the user has not indicated an intention to use the current camera view to show background video content visible in a surrounding environment; and
reduce uplink transmissions allocated to video content corresponding to the current camera view until one or more faces are visible in the current camera view in response to determining that the user is inactive on the camera.

* * * * *